Aug. 8, 1933.  B. J. TAMARIN  1,921,439
VACUUM CLEANER HANDLE STRUCTURE
Filed Dec. 26, 1929   3 Sheets-Sheet 1
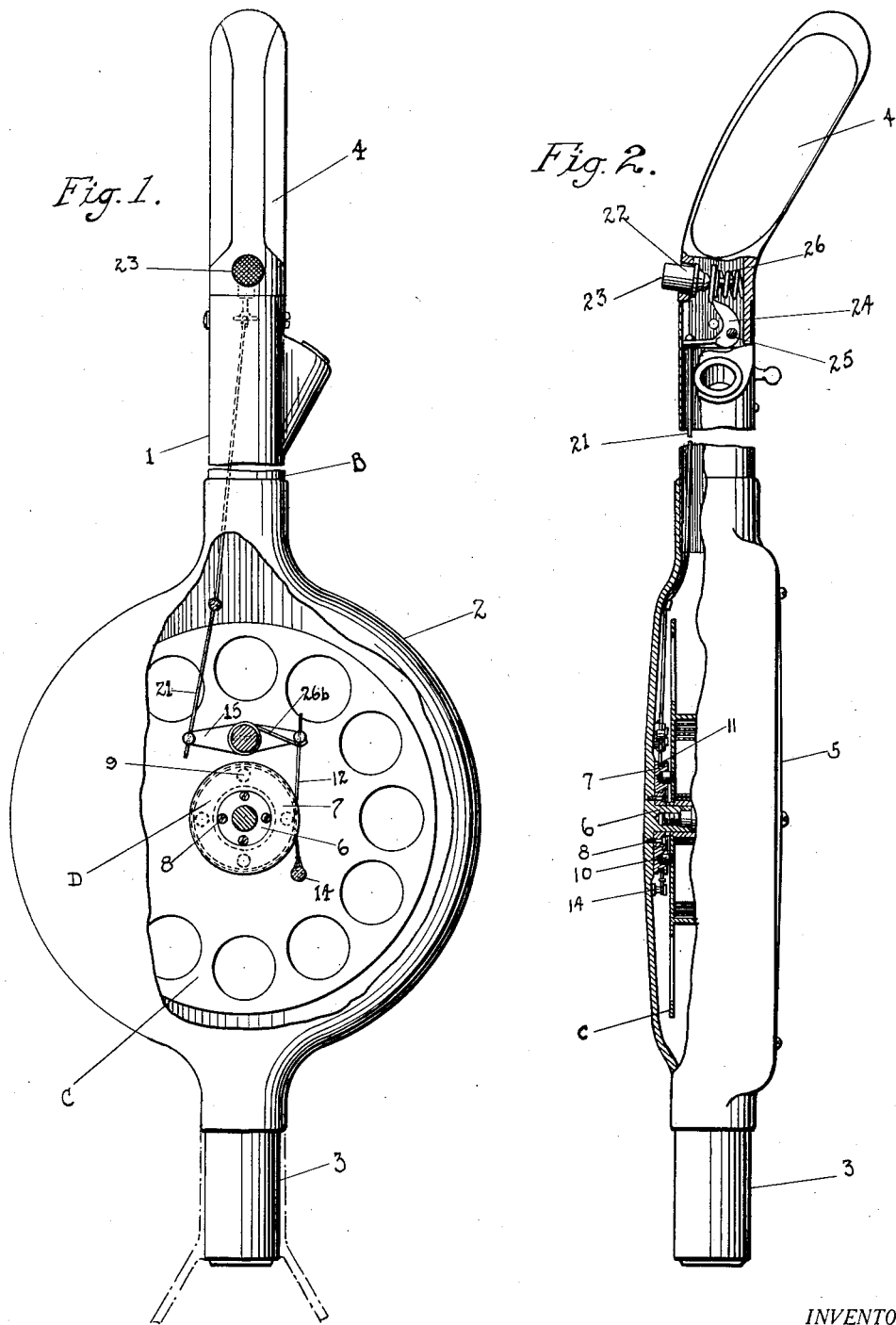
INVENTOR.
BERNARD J. TAMARIN
BY
Linton, Kellogg & Smith
ATTORNEY.

Aug. 8, 1933.   B. J. TAMARIN   1,921,439
VACUUM CLEANER HANDLE STRUCTURE
Filed Dec. 26, 1929   3 Sheets-Sheet 2
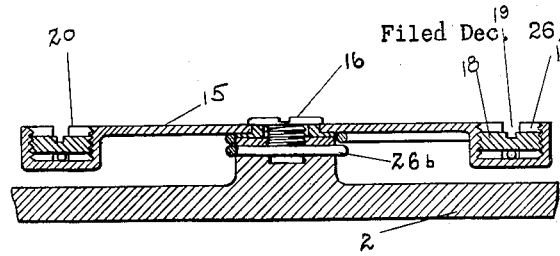
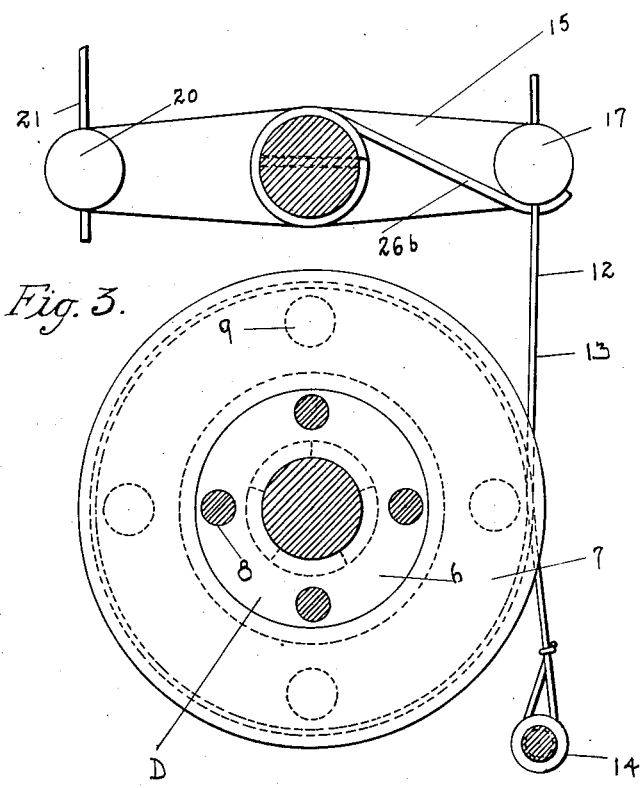
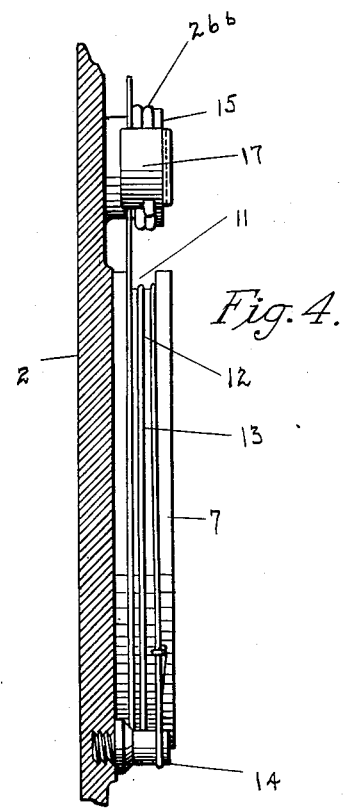
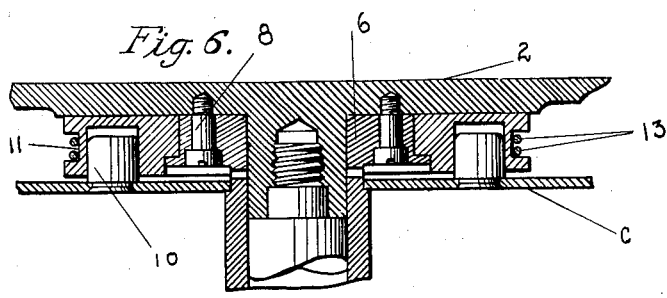
INVENTOR.
BERNARD J. TAMARIN
BY Linton, Kellogg & Smith
ATTORNEY.

Aug. 8, 1933.   B. J. TAMARIN   1,921,439
VACUUM CLEANER HANDLE STRUCTURE
Filed Dec. 26, 1929   3 Sheets-Sheet 3
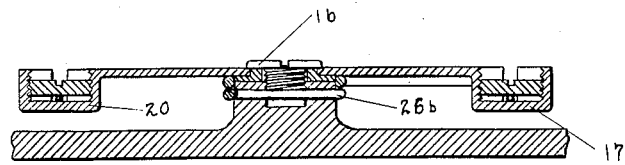
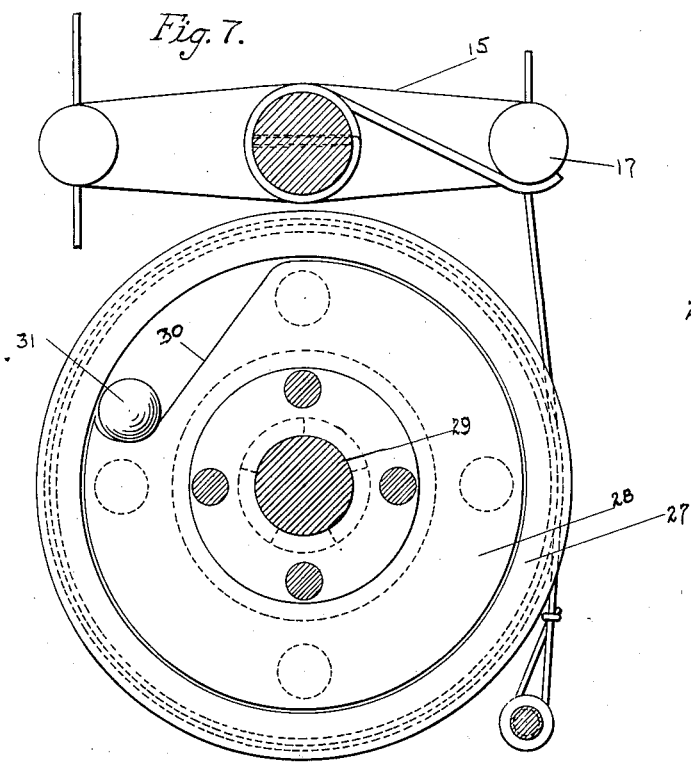
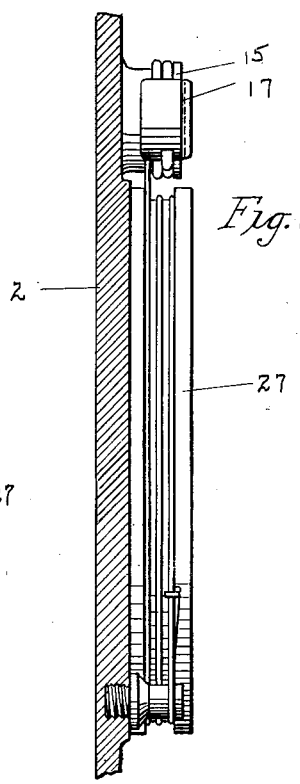
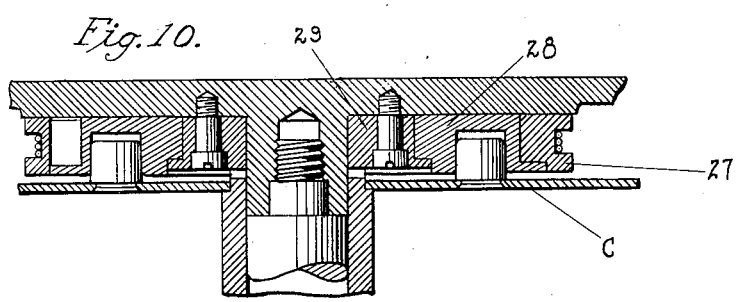
INVENTOR.
Bernard J. Tamarin
BY
Linton, Kellogg & Smith
ATTORNEY.

Patented Aug. 8, 1933

1,921,439

UNITED STATES PATENT OFFICE

1,921,439

VACUUM CLEANER HANDLE STRUCTURE

Bernard Jacques Tamarin, Philadelphia, Pa.

Application December 26, 1929. Serial No. 416,678

1 Claim. (Cl. 242—107)

This invention relates to a handle structure and more particularly to a construction of handle for use with vacuum cleaners and has for its primary object a design of handle incorporating a cord take up reel and a novel form of braking mechanism therefor.

An object of the invention is the arrangement, in a novel and unique manner, of a handle device, a completely concealed electric cord take up reel and a brake device capable of operation from the hand grip of the handle and having an expansible and contractible yieldable frictional connection with the reel for controlling the movements of the latter.

Another object of the invention resides in the novel form of brake mechanism utilized, consisting basically of an expansible and contractible yieldable brake element encircling a part of the reel structure and manipulated by a remotely arranged manipulator.

Another feature of the invention resides in the utilization of a push button type of manipulator having a novel form of connection with an expansible and contractible brake element that has a unique arrangement with a part of the reel structure for accurately and positively controlling movements of the reel structure.

Besides the above, my invention is distinguished in a simplified type of brake device that may be manipulated from a remote point and consisting of component parts that are solely supported by the handle, thereby enabling the reel device to be mounted or removed as a unit, independent of the braking mechanism.

With these and other objects in view, the invention will be better understood from the following detailed description taken in connection with the accompanying drawings, wherein:

Figure 1 is an elevation of the handle with portions broken away,

Figure 2 is a side elevation with portions broken away,

Figure 3 is a horizontal sectional view of the brake mechanism,

Figure 4 is a side elevation of the brake mechanism and associated parts,

Figure 5 is a transverse sectional view of a portion of the brake mechanism,

Figure 6 is a detailed sectional view of the brake ring and associated parts,

Figure 7 is a horizontal sectional view of a modification of the invention,

Figure 8 is a side elevation,

Figure 9 is a vertical sectional view of the lever and associated parts,

Figure 10 is a sectional view of the brake ring and lock ring and associated parts.

The present invention, a continuation in part of my copending application Serial Numbered 83,918 filed January 26, 1926, now Patent 1,887,173, dated Nov. 8, 1932, relates principally to a unique form of brake mechanism arranged in a novel relation with a reel structure and a handle structure, these parts combining to produce an article not only possessing great utility but having aesthetic characteristics that materially add to the attractiveness of the vacuum cleaner head to which the handle is attached.

My improved type of vacuum cleaner handle consists primarily of a handle structure B, a reel structure C, and brake mechanism D assembled in a novel relation.

The handle structure B consists of a handle proper 1, a casing or housing 2, attaching plug 3, and a hand grip 4. The casing 2 is provided with an opening covered by a plate 5, whereby the reel structure C may be arranged in place.

The reel structure C is constructed practically the same as set forth in my various pending applications, particularly Serial Number 83,918 and as the specific details of this reel structure do not form any part of the present invention, further consideration thereof is eliminated for the purpose of clarity. On the interior surface of the housing 2 is a hub structure 6 upon which is rotatably mounted a brake ring 7. The design and co-relation of the hub structure 6 and the ring 7 is such that upon removing the screws 8 the brake ring may be disconnected from the hub structure. This brake ring 7 is provided with a plurality of recesses 9 for the reception of lugs 10 carried by the reel structure. Thus, it will be appreciated that the reel structure is free to be bodily moved away from engagement with the brake ring but relative turning movements therebetween are absolutely prevented.

This brake ring 7 is provided with a peripheral groove 11, around which is wrapped a novel form of brake element 12 which is now to be described. This particular brake element 12 which must possess expansible and contractible characteristics for varying the frictional engagement thereof with the peripheral surface of the brake ring 7 is illustrated in this particular instance as in the form of a strip of wire bent to provide a plurality of convolutions 13 which encircle the peripheral surface of the brake ring so that upon contracting of the convolutions an effective gripping action is created upon the peripheral surface of the brake ring for retarding movement thereof, whereas expansible movement of the convolutions relieves the ring of frictional engagement that would interfere with the turning thereof. To accomplish these desired movements of the convolutions, one end of the brake element is secured to an anchorage as illustrated at 14 whereas the other end portion is secured in one end of a lever 15 that is directly pivoted to the interior surface of the housing by the pivot screw 16.

It is of course to be understood that the extremity of the brake element may be connected to the lever 15 in any suitable manner but I have found from experience that a simplified connection may be accomplished by providing a cup 17 on the end of the lever in which a plug 18 fits that is adapted to engage and frictionally hold the end of the brake element which is lodged in the slot 19 of the cup. This identical construction is utilized at the other end of the lever as shown at 20, to secure one end of the connector or pull wire 21 that extends to the manipulator 22 associated with the handle grip 4. In this instance the manipulator 22 consists of a thumb piece or button 23, slidably mounted in the hand grip to have a portion protrude above the surface thereof to be conveniently engaged by the thumb of the hand. This button 23 has frictionless engagement with one arm of the bell crank lever 24 pivoted to the interior handle as indicated at 25. A spring 26 is utilized to hold the thumb button extended and the bell crank lever in normal position. The other end of the bell crank lever is connected to the pull wire 21 and thus it will be appreciated that upon pressing of the thumb piece 23 the bell crank lever will rock about its pivot against the action of the spring 26 for drawing the pull wire toward the hand grip and thereby release the brake mechanism. To facilitate the return of the parts to normal position, I have illustrated a spring 26b associated with the lever 15 forcing the lever 15 to normal position and co-operating with spring 26b to hold the brake mechanism in braking position.

In Figures 7 to 10 inclusive, I have illustrated a brake ring 27 that has direct sliding contact with a lock ring 28 which is directly mounted on the hub structure 29. To enable these rings to turn as a unit or to turn relative to each other, I have illustrated the lock ring 28 as possessing a cam surface 30 coacting with a ball 31 arranged between the cam surface 30 and the internal peripheral surface of the ring 27. Thus, it will be appreciated that movement of the ring 28 relative to the ring 27, in a counter clockwise direction will establish a locking engagement between the ball 31 and the contacting surface of both rings. This locking connection causes both rings to turn as a unit, bringing into play thereby the constricting frictional braking action of brake element 12 encircling the peripheral surface of ring 27.

Complete release of the rings 27 and 28 in order that they may move integrally, in a counter clockwise direction, may be accomplished by pressure on the push button 23 causing the bell crank lever 24 pivoted at 25 to exert a pull on control wire 21, in the direction of the hand grip, rocking the lever 15 thereby and causing its opposite extremity to which brake element 12 is attached to move in such manner as to overcome the braking tension created by spring 26b.

Attention is called to the fact in Figures 7 to 10 inclusive; that when ring 28 is moved in a clockwise direction the ball 31 is moved to a non-gripping position and as a result the ring 28 is free to move independently of the frictionally engaged ring 27, thereby entirely freeing the reel structure of any braking action.

In the use of my improved form of vacuum cleaner handle, the hand grip 4 is utilized to move the machine from place to place and as the manipulator 22 is arranged conveniently to the hand grip, it will be appreciated that the same hand that operates the vacuum cleaner may be utilized to operate the push button 23 for controlling the movement of the reel structure C. In the depression of the push button 23 the bell crank 24 is rocked about its pivot for forcing the pull wire toward the hand grip. This action of the pull wire rocks the lever 15 which in turn forces extremity 12 toward the other extremity of the brake element, which creates an expanding action of the convolutions of the brake element for relieving the ring 7 of a braking action that would stop the same. It will be appreciated that when the push button is relieved of pressure the spring 26b reacts for returning the parts to normal position, thereby contracting the size of the convolutions and creating a frictional engagement between the convolutions and the peripheral surface of the ring, so that when there is a tendency to move the latter in a counter clockwise direction the frictional engagement between the convolutions and the ring will increase, thereby accomplishing a positive braking action that will hold the reel struce against movement until relieved by depressing of the push button.

In the movement of the brake ring in a reverse direction the frictional engagement between the convolutions and the ring will be in a direction to expand the convolutions thereby relieving the ring of excessive friction, and thus it will be appreciated that the reel structure may be free to move in its reverse direction.

With the use of the companion rings 27 and 28 illustrated in the modification of my invention, it will be appreciated that the reel structure may be rotated independently of the brake mechanism when the ring 28 is moved in a clockwise direction, but when the ring 28 is moved in a counter clockwise direction the rings are locked together by the ball 31 thereby bringing the brake mechanism into play for operation as set forth above.

It is of course to be understood that various changes may be made in the various parts as constructed and assembled without departing from the spirit of the invention which resides in the basic idea of associating a novel form of handle, a reel structure and a brake mechanism and remote control therefor, in a novel relation whereby a new braking principle may be utilized in the controlling of the action of a reel structure utilized with a vacuum cleaner for controlling the movements of the electric conductors thereof.

What I claim is:

In combination, a casing, a hub projecting laterally from the interior surface of the casing, a reel, a brake ring rotatably mounted on said hub and detachably engaged with said reel, a brake element encircling said ring several times and one end fixed to said casing, a lever having a central portion pivotally connected to the casing and one end fixed to the remaining end of the brake element, a remotely arranged push button and a flexible connection between the push button and the remaining end of said lever.

BERNARD JACQUES TAMARIN.